United States Patent [19]
Tokuda et al.

[11] 4,429,967
[45] Feb. 7, 1984

[54] DISTANCE MEASURING SYSTEM

[75] Inventors: Ryuji Tokuda; Masahiko Ogawa, both of Tokyo; Tokuichi Tsunekawa, Kanagawa; Shuichi Tamura, Yokohama, all of Japan

[73] Assignee: Canon Kabushiki Kaisha, Japan

[21] Appl. No.: 391,394

[22] Filed: Jun. 23, 1982

Related U.S. Application Data

[63] Continuation of Ser. No. 33,334, Apr. 25, 1979, abandoned.

[30] Foreign Application Priority Data

Apr. 28, 1978 [JP] Japan .................................. 53-51856

[51] Int. Cl.$^3$ ........................... G03B 3/00; G01C 3/10
[52] U.S. Cl. ............................. 354/403; 250/214 AG; 356/1; 356/4
[58] Field of Search ................. 354/25 R, 25 A, 25 P, 354/25 N, 165; 352/140; 250/201, 204, 214 AG, 214 C; 356/1, 4

[56] References Cited

U.S. PATENT DOCUMENTS

| | | | |
|---|---|---|---|
| 3,820,129 | 6/1974 | Hosoe et al. | 354/25 A |
| 3,906,389 | 9/1975 | Matsumoto et al. | 354/25 A |
| 3,999,192 | 12/1976 | Hosoe et al. | 354/25 |
| 4,032,934 | 6/1977 | Hendrickson et al. | 354/25 A |
| 4,123,650 | 10/1978 | Hosoe et al. | 354/25 X |

*Primary Examiner*—William B. Perkey
*Attorney, Agent, or Firm*—Toren, McGeady and Stanger

[57] ABSTRACT

In the distance measuring system disclosed, light reflected from an object is converted into an electrical signal and processed to detect the distance to the object. Before the distance detecting operation, a signal level detecting operation is carried out in the distance measuring range and the gain of the signal processing or the amount of light for illuminating the object is automatically set for the distance detecting operation.

7 Claims, 44 Drawing Figures

F I G. 1
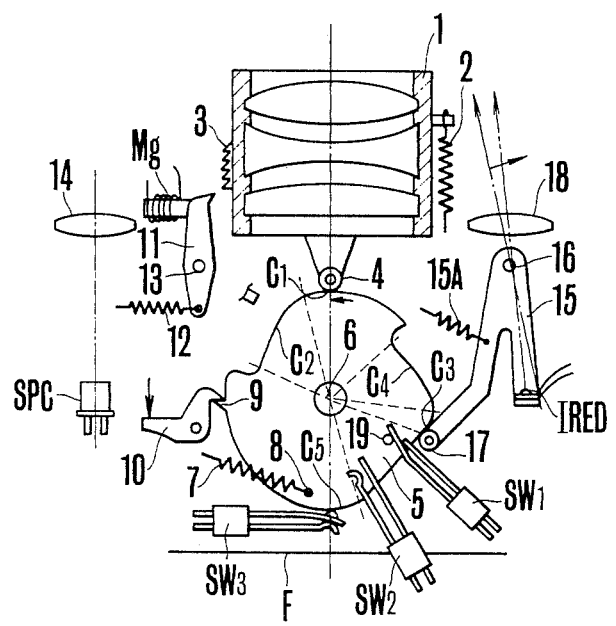

(a)

(b)

(c)

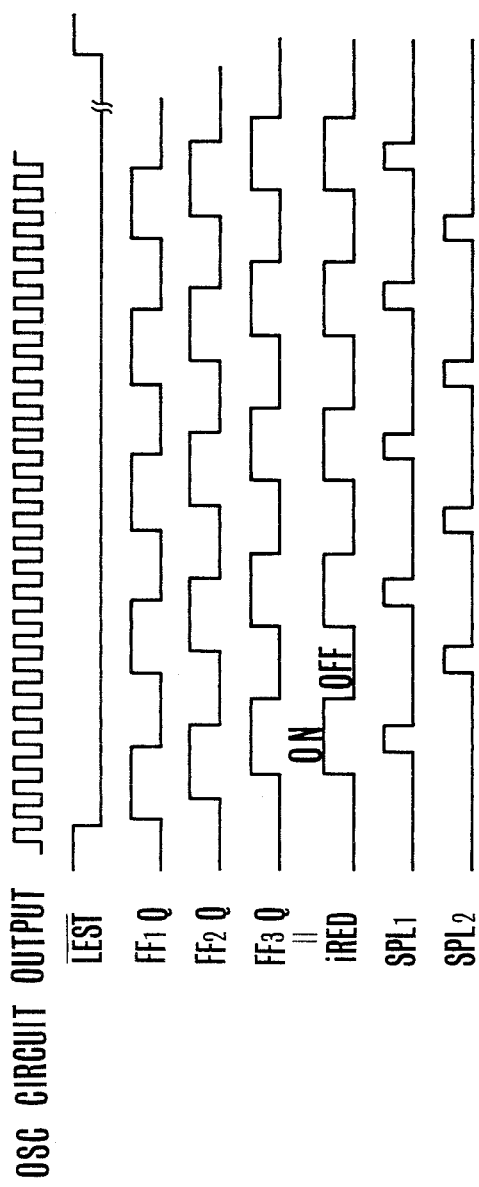

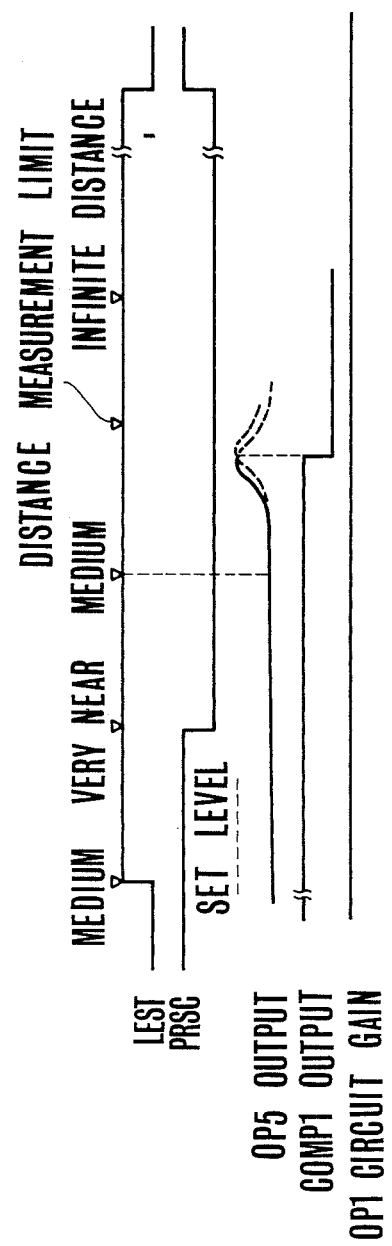

DISTANCE MEASURING SYSTEM

REFERENCE TO RELATED APPLICATIONS

This is a continuation of application Ser. No. 033,334 filed Apr. 25, 1979, and now abandoned.

BACKGROUND OF THE INVENTION

The present invention relates to a distance measuring system, particularly suited for optical instruments such as photographic cameras.

DESCRIPTION OF THE PRIOR ART

Various distance measuring apparatus for measuring the distance to an object have been proposed. For example, in the photographic camera art, various techniques for automatically detecting the distance to an object and automatically focusing the photographic lens have been proposed and used. Such distance measuring apparatus can be roughly divided into two kinds. One is the so-called passive system wherein without using any illuminating light for the object, the pattern of the light reflected from the object is converted by a brightness converting device into an electrical signal. Such a system is disclosed in Japanese Patent Publication No. Sho No. 41-13669. Here, the maximum or the minimum signal of the photoelectric converting device composed of only one photoelectrical element is detected. Such a system is also disclosed in U.S. Pat. No. 3,838,275, where the distance is measured by triangulation with a photoelectrical converting device composed of two photoelectric element groups.

The other type of apparatus is disclosed in U.S. Pat. No. 3,435,744. Here, a light projector is provided at the camera so as to scan the object by means of the projected light beam and the maximum value of the light beam reflected on the object is detected so as to measure the distance.

The two systems have their respective merits. However, in both systems, distance measurement is carried out by photoelectric conversion of the light reflected on the object, so that the distance measurement operation is not always sure of depending upon the distance to the object, especially at a great distance. Also, the first system has a weak point in that when the object is dim, the distance measurement operation is not certain due to the sensitivity limit of the photoelectric converting part. In the second system, although the measurable distance limit can be increased by increasing the intensity of the light beam, the power consumption is substantially increased so that it becomes necessary to carry the power source in a separate case. This makes it impossible to incorporate the apparatus in a small camera. On the other hand, if the intensity of the light beam is increased, the output of the photoelectric converting device becomes high in the range of short distances so that the level of the photoelectrically converted signal surpasses a predetermined value depending upon the distance to be measured.

Also, in the second system the object is very often illuminated with other brighter light sources, such as the sun or a fluorescent lamp. Hence, not only the illumination light beam but also the noise light component are photoelectrically converted so that the distance measuring accuracy is decreased. As compared with the distance measuring light component (illumination light beam, reflected light beam) the noise light component is quite a large D.C. or a low frequency component with reference to the level, so that it is difficult to increase the S/N ratio only by means of a high pass filter. As a result, the distance measuring accuracy is decreased with this pseudo-distance measuring signal component.

SUMMARY OF THE INVENTION

An object of the present invention is to eliminate the aforementioned disadvantages of the conventional distance measuring apparatus.

According to a feature of the invention, the level of the photoelectric converting signal in the distance range is detected before the distance measuring operation and the gain of the distance measurement operation set accordingly.

According to another feature of the invention, the gain of the signal processing circuit used or the amount of the light beam is selected in advance in accordance with the detected level (hereinafter, the operation before this selection is called distance measurement preparation mode) and then the distance measurement operation (hereinafter called the distance measurement mode) is carried out in accordance with the selected gain or the selected light amount.

Another purpose of the present invention is to offer a distance measuring system suitable for a camera.

According to another feature of the invention, distance setting of the photographic lens is prevented during the distance measurement mode.

The present invention increases the S/N ratio of the second system, by causing the light beam to be projected to the object to flicker, while the output of a photoelectric converting device at the time of flickering is simultaneously applied to the signal processing circuit.

These and other features of the invention are pointed out in the claims. Other objects and advantages of the present invention will be evident from the following detailed description when read in light of the drawings of the embodiments of the present invention.

BRIEF DESCRIPTION OF THE DRAWINGS

FIG. 1 shows a part of the distance measuring device in accordance with the present invention for camera.

FIGS. 4(A)(a) to 4(A)(h) illustrate the operation of the electrical circuit shown in FIG. 3.

FIGS. 6(C)(a) to 6(C)(e) illustrate the operation when the object is at the limit of the distance measurement.

DESCRIPTION OF THE PREFERRED EMBODIMENT

Figure 2:
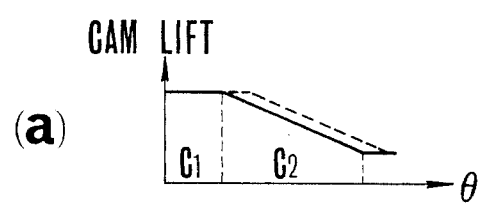
FIGS. 2a to 2c show the operation of the cam plate shown in FIG. 1.
Figure 2:
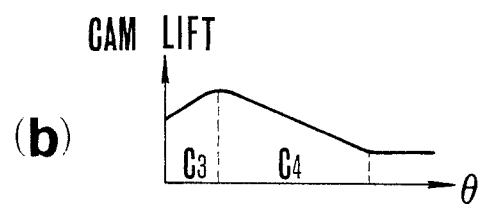
Figure 2:
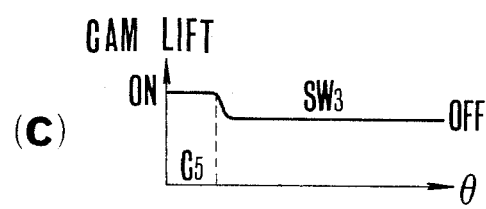

FIGS. 1–6(C)(e) show the distance measuring device for the photographic camera in accordance with the second system of the present invention, particularly to the so-called auto focus device by means of which the distance is automatically set at the taking lens by the distance measuring device.

In FIG. 1, a lens barrel 1 holds the photographing or taking lens. FIG. 1 also shows a driving spring 2 provided in the lens barrel, a holding claw part or ratchet 3 on the circumference of the lens barrel 1, an engaging lever 4 projecting integrally from the lower end of the lens barrel 1 and having a pin with a roller at the end, a cam plate 5 rotatable on the camera frame by means of a shaft 6, and a driving spring 7 hold by means of a pin 8 on the cam plate 5. The cam plate 5 is connected to the shutter or film winding mechanism by means of an engaging mechanism. The latter operates so that when the winding operation of the camera rotates the cam plate clockwise, the cam plate 5 energizes the spring 7, and the cam plate is set in the ready state when a holding claw 9 of the cam plate 5 engages a pawl 10. A holding claw 11 with a claw-shaped S end is normally urged clockwise by means of a spring 12 about a middle shaft 13. One end of the claw is held as is shown in the drawing by the attracting strength of a magnet Mg. A photoelectric converting element SPC such as a silicon photocell has a sensitivity range particularly in the ultrared range. A photo receiving lens 14 is provided in front of the SPC element. A fork shaped scanning lever 15 on a shaft 16 is moved while a roller 17 provided at one end is guided by means of the cam plate 5. A high efficiency photoelectric light emitting element IRED (for example an ultrared LED) is secured at the other bent end of the scanning lever 15 and has its light passing through a light projecting lens 18 provided in front of element IRED. The scanning lever 15 is located at a position at which when the cam plate 5 is rotated by means of the spring 15A so that the light beam is directed to the object through the light projecting lens 18, so as to cross the principal optical axis of the photographic lens. The light beam passes horizontally so that the reflected scanning beam strikes the element SPC.

It is preferable that the light projecting lens 18 be located at the position at which the image is near the limit of the distance which can actually be reached by the element IRED, for example, about 4 m. If the length of the optical path between the element IRED and the light projecting lens 18 is sufficient, the light projecting lens 18 may be provided in such a manner that the beam is parallel. Operation in the distance measurement preparation mode is carried out by cam parts or surfaces $C_1$ and $C_3$ on the circumference of the cam plate 5, while in the distance measurement mode, it is carried out by the cam parts or surfaces $C_2$ and $C_4$. The scanning lever 15 is moved by means of the cam part $C_3$, whereby in case the distance measuring range is middle, for example, about 5 m. IRED radiates a beam to the object between the position at 2 m and that at very close distances and then the beam is moved from the very close distance to the infinite distance in the distance measuring mode by means of the cam $C_4$. Because the cam surface $C_1$ corresponding to the cam surface $C_3$ forms a part of a circle, the barrel 1 of the photographing lens is not moved by the cam surface $C_1$, but moved from up close toward infinity in the distance measuring mode. Thus, the optical axis of the photographic lens is a little out of alignment with the light receiving lens 14. If both optical axes are arranged close to each other in a camera, both axes can be considered to be practically aligned with each other. Consequently, when the beam of the element IRED scans the object by the movement of the scanning lever 15, the output of the element SPC is at a maximum when the beam scans a position at 2 m if the object is at 2 m. Hence, the 2 m position of the photographic lens is the approximate distance measurement position.

FIG. 1 includes a pin 19 on the cam plate 5, start switches $SW_1$, $SW_2$, $SW_3$, a meter switch 5 and the distance measurement preparation mode termination switch. The switch $SW_1$ is opened immediately after the movement of the cam plate 5, the switch $SW_2$ is closed with the photographic objective lens reaches the 5 m focusing distance and the switch $SW_3$ is kept closed by the cam surface $C_5$ until termination of the distance measurement mode and is opened in the distance measurement mode. The amount of the lift of the cam parts $C_1$–$C_5$ is shown in FIG. 2. Details will be explained after the following outline of the operation.

In operation, when the shutter button (not shown in the drawing) is depressed one step, the main switch which is engaged to the shutter button is closed. This energizes the electromagnet Mg so that the holding claw 11 is attracted by the magnet Mg against the force of the spring 12. Then, at the second step in the stroke of the shutter button, the holder 10 is disengaged from the claw 9 and the spring 7 starts to rotate the cam plate 5 clockwise. The cam plate 5 now starts to rotate clockwise at a constant speed set by a mechanical constant speed governer not shown in the drawing. The cam surface $C_3$ moves the scanning lever 15 so that the object, which lies between 2 m and a very close distance, is detected by the element SPC. The gain of a signal processing circuit which receives the output of element SPC is set low, while if there is no output from the element SPC, the gain remains high. Then, as will be explained, the output signal of the element SPC or the signal of a timer circuit demagnetizes the magnet Mg, the holding claw 11 is moved to engage the claw part or ratchet 3 by means of the spring 12 so as to stop the movement of the lens barrel 1, and then the shutter is released. The element IRED and the element SPC have a respective high light emitting efficiency and a high light sensing efficiency in the range of the infrared light. However, it goes without saying that the range is not limited to the infrared light but can be visible light as well as the ultraviolet light.

Figure 3:
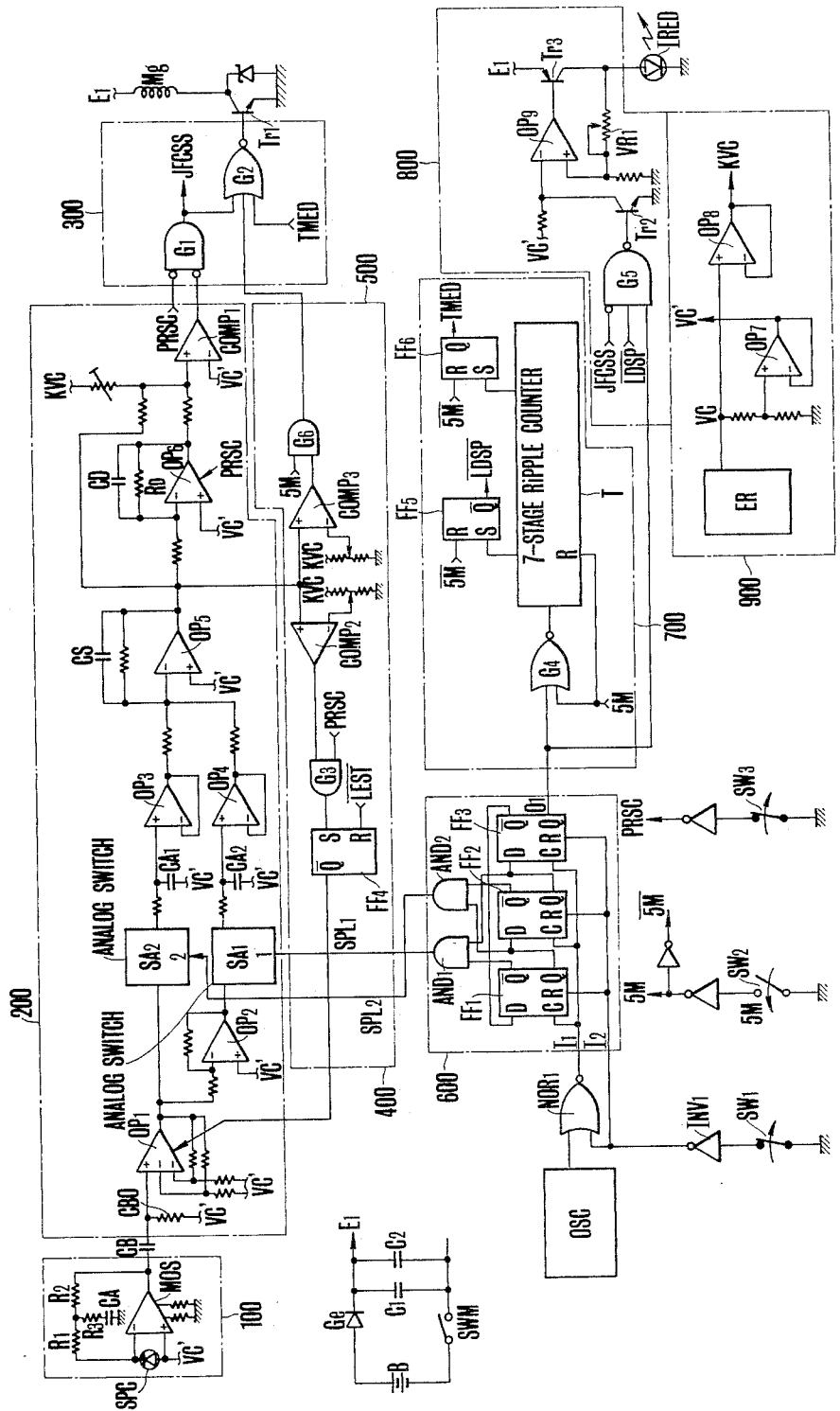
FIG. 3 shows the electrical circuit for the distance measuring device shown in FIG. 1.

FIG. 3 shows the distance measuring electrical circuit to be used together with the mechanism shown in FIG. 1. FIG. 3 includes a converting circuit 100 for responding to the photoelectric converting element SPC, a signal processing circuit 200, a prohibiting and driving circuit 300, a gain selection control circuit 400, a constant distance setting circuit 500, a generator 600 of a control signal such as a sample hold signal, a frequency dividing signal and so on, a timer circuit 700, an IRED element light emitting driving circuit 800, and a constant voltage circuit 900. The entire circuit principally is composed of respective circuits 100–900. Details of the respective circuits are as follows:

1. Converting Circuit 100

The light sensing element SPC is connected between the inverted and the non-inverted input of the operational amplifier circuit MOS composed of MOS-Bi. The non-inverting input receives a constant voltage bias signal Vc' from the constant voltage circuit 900. Connected between the input and the output of the operational amplifier circuit MOS is a high pass filter composed of resistances $R_1$-$R_3$ and a capacitor CA. A high frequency operational amplifier circuit MOS surpresses the D.C. or the low frequency components by means of the feed back circuit. The ratio of the output voltage Vo of the amplifying circuit MOS to the photocurrent iSPC of the element SPC is $R_1+R_2$ in the low frequency range and $(R_1+R_2)+R_1R_2/R_3$ in the high frequency range, so that the amount of the low frequency component to be suppressed can be optionally selected by selecting the resistances $R_1$, $R_2$ and $R_3$. The output of the operational amplifier MOS is connected to the signal processing circuit 200 of the next step through a capacitor CB so that the low frequency components are further excluded by means of the high pass filter composed of the capacitor CB and the resistance CBO before the output of the circuit MOS is applied to the circuit 200.

2. Control Signal Producing Circuit 600

The circuit 600 is constituted of a 1/6 frequency dividing circuit composed of three flip-flops $FF_1$, $FF_2$ and $FF_3$ and AND circuits $AND_1$ and $AND_2$. The C inputs of the flip-flops $FF_1$-$FF_3$ are connected to each other with an input line $I_1$, while R inputs are connected to each other by an input line $I_2$. The input line $I_1$ is connected to the NOR circuit $NOR_1$ having an input terminal connected to the output of a 60 KHz pulse generator OSC and another input terminal connected to the switch $SW_1$ through the inverter $INV_1$. The input line $I_2$ is connected to the switch $SW_1$ through an inverter $INV_1$. Consequently, when the switch $SW_1$ is opened at the time of starting as mentioned above, each of the flip-flops $FF_1$-$FF_3$ through the gate $NOR_1$ and the input line $I_1$. As a result, the frequency divided signals $SPL_1$ and $SPL_2$ in FIG. 4(A) are obtained from the gates $AND_1$ and $AND_2$, while the Q terminal of the flip-flop $FF_3$ produces a control signal as shown by $FF_3Q$ in FIG. 4(A).

3. Signal Processing Circuit 200

The circuit 200 is composed of a gain selection amplifier $OP_1$, sample and hold operational amplifiers $OP_3$, $OP_4$ to whose input analog switching circuits $SA_1$, $SA_2$ and a delay amplifier $OP_6$ and a comparator circuit $COMP_1$. Control pulses $SPL_1$, $SPL_2$ are applied to the terminals 1, 2 of the analog switch circuits $SA_1$, $SA_2$. When the level of the signal is high, the output of the gain selection amplifier $OP_1$ or the inverted output of the operational amplifier $OP_2$ is sampled, while when the level of the signal is low, each of the samples is held. The control pulse $SPL_1$ is obtained from the AND operation of the inverted output $\overline{Q}$ of flip-flop $FF_1$ with the set output Q of flip-flop $FF_2$ so that the level of the control pulse $SPL_1$ is high while element IRED is lit, while it is low while element IRED is not lit. Thus, the output of the element SPC when the element IRED is lit is supplied to the analog switch circuit $SA_1$. The level of the control pulse $SPL_2$ which is obtained from the AND operation of AND gate $AN_2$ on the output Q of flip-flop $FF_1$ and the output $\overline{Q}$ of flip-flop $FF_2$ becomes high when element IRED is not lit so that the output of the element SPC is sampled and held when the element IRED is not lit. (The flickering operation of the element IRED is explained in connection with the element IRED light emitting drive circuit 800.)

Figure 4B:
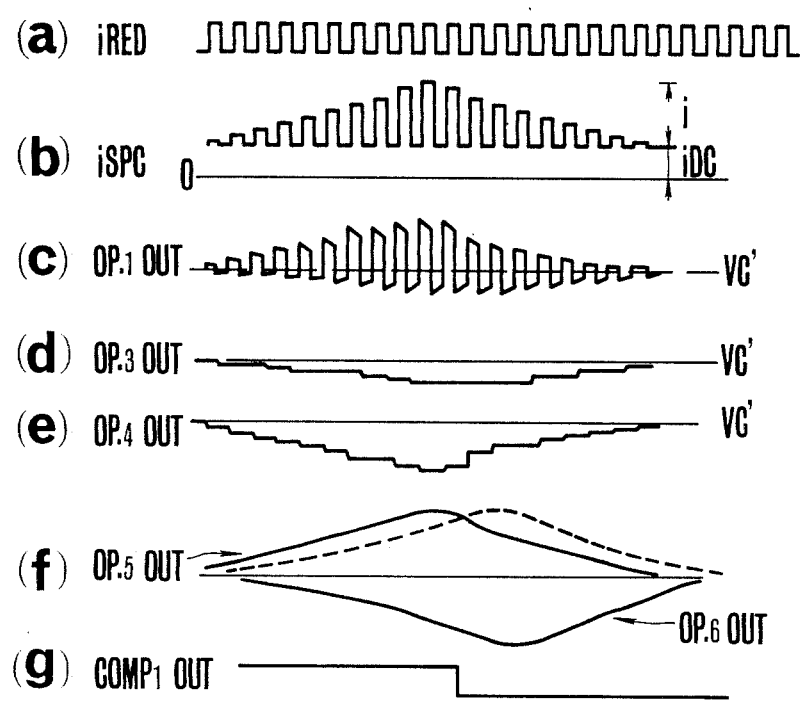
FIGS. 4(B)(a) to 4(B)(g) illustrate the operation of the electrical circuit shown in FIG. 3 in the distance measuring mode.
Figure 5:
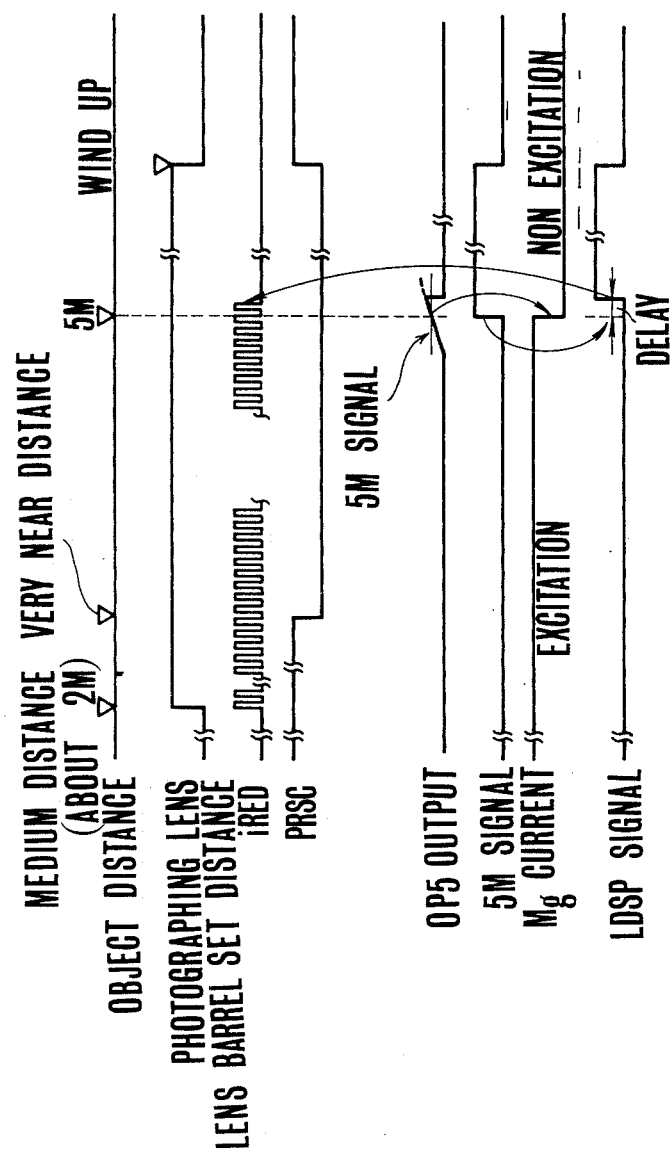
FIGS. 5(a) through 5(h) show the operation of respective modes of the electrical circuit shown in FIG. 3.
Figure 6A:
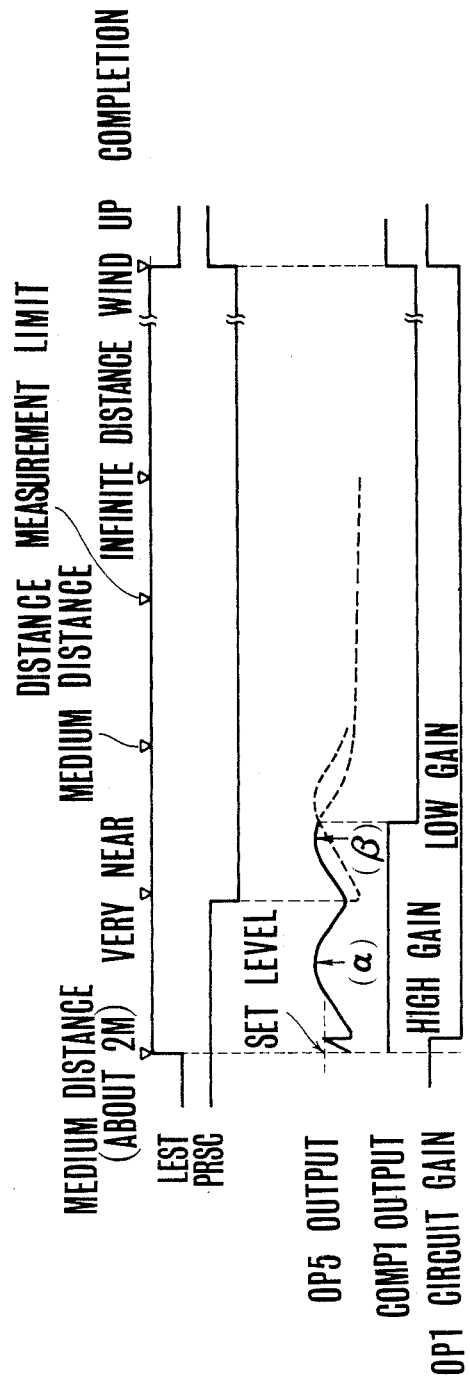
FIGS. 6(A)(a) to 6(A)(e) show the operation of the electrical circuit when the object is very close and at a medium distance.
Figure 6B:
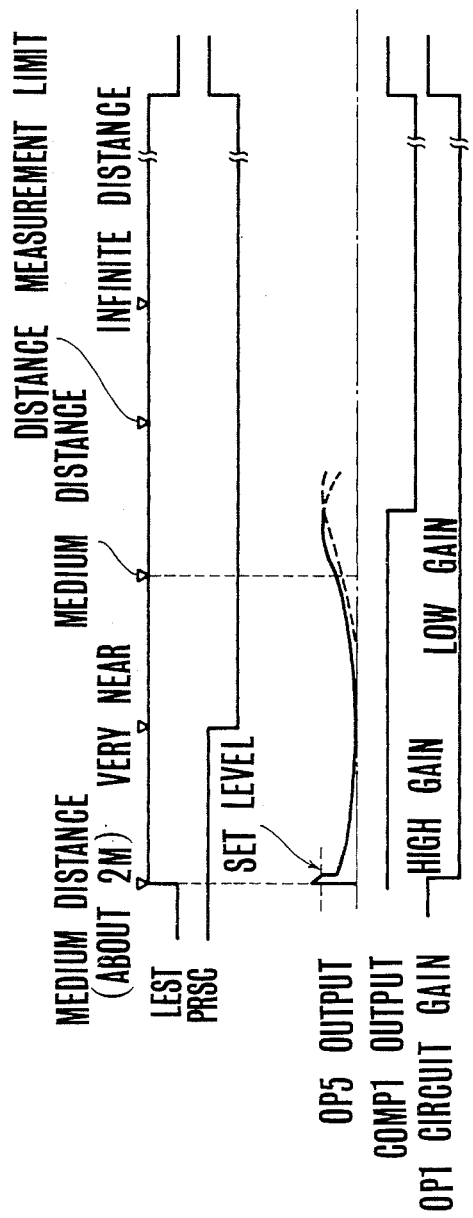
FIGS. 6(B)(a) to 6(B)(e) show the operation of the electrical circuit in FIG. 3 when the object is near a medium distance.

FIG. 4 shows the waveforms of the signals of respective circuits in the distance measuring mode. For the sake of simplicity, the distance measurement preparation made is omitted. Before and after the beam emitted from the element IRED passes the object aimed at with the light receiving lens 14, the current value of the element SPC varies, as mentioned. The driving current iRED of the element IRED is of impulse shape so as to light up the element IRED periodically (FIG. 4(B)(a)) so that the output current iSPC of the element SPC assumes the waveform as shown by (b) in FIG. 4(B).

It is first supposed that the object is illuminated evenly by daylight or an illumination lamp. The iDC component then increases in accordance with the intensity of the illumination light. The DC component of the output of the element SPC is supressed by the converting circuit 100 and interrupted by the connecting capacitor CB. Hence, the waveform after amplification by circuit $OP_1$ is as shown by graph (c) in FIG. 4(B). As mentioned, the analog switch circuit $SA_1$ samples the inverted output of the circuit $OP_1$ while the element IRED is lit, so that the output of the circuit $OP_4$ exhibits the waveform shown by graph (e) in FIG. 4(B). At the same time, the analog switch $SA_2$ samples the output of the circuit $OP_1$ while the element IRED is put out so that the output of the circuit $OP_3$ assumes the waveform shown by graph (d) in FIG. 4(B). Both signals obtained in this way are applied to the non-inverting input of the adding amplifier $OP_5$ so as to be added. The signals are smoothed by means of the capacitor Cs in the feedback circuit and exhibit the waveform shown as $OP_5$ OUT corresponds to the position of the maximum value of signal iSPC, which means that the optical axis of the light receiving lens 14 crosses the scanning direction of the element IRED. Specifically, the scanning beam illuminates the light measuring position of the object so as to indicate that the position is the distance measuring position.

The detection of the maximum value is carried out by a delay amplifying circuit $OP_6$ and a comparison circuit $COMP_1$. In the feedback circuit of the delay amplifying circuit $OP_6$, a delay circuit composed of a capacitor CD that forms a comparatively large time constant with a resistance RD so that the signal $OP_5$ OUT applied to the inverting input $OP_6$ is delivered delayed by a predetermined time. This is shown in FIG. 4(B)(f) $OP_6$ OUT as added to the output of the circuit $OP_5$. The phase of the signal $OP_5$OUT and that of the $OP_6$OUT is inverted by means of the circuit $OP_6$ so that the addition of both signals results in subtraction, namely the subtraction between the waveform in the dotted lines at graph (f) in FIG. 4(B) and the signal $OP_5$OUT. As a result, at the time JFCS at which the levels of the both signals correspond to each other, the level of the one input of the comparator $COMP_1$ becomes zero. Before and after the time the level of the signal becomes positive and negative respectively. At the time at which the input level becomes lower than a given level Vc', namely immediately before the time JFCS the comparison circuit $COMP_1$ delivers the inverted output (FIG. 4(B)(g)). The time JFCS is delayed from the distance measuring signal time point JFCS' by a time corresponding to the time constant of the delay. However, the difference between the times JFCS and JFCS' can be compensated for when, with the predetermined level of the signal Vc' is being taken into consideration, the amount of lift of the cam surface $C_2$ shown in FIG. 2(a) is shaped so as to be delayed from the actual lift amount (dotted line in the drawing). As long as the switch $SW_3$ is closed, namely during the distance measurement mode, the distance measurement preparation mode signal PRSC at its high level is applied to the delay amplifying circuit $OP_6$ through the inverter $INV_3$ so as to prohibit the operation of the circuit $OP_6$. Hence, the distance measurement operation is never carried out.

4. Prohibition Drive Circuit 300

The circuit 300 is composed of an AND CIRCUIT $G_1$ and a NOR circuit $G_2$. The input of the circuit $G_1$ receives the signal PRS, namely the distance measurement preparation mode signal while the other input receives the output of the circuit $COMP_1$. Only when the level of the output of the circuit $COMP_1$ goes low while the level of the signal PRSC is low, is the distance measurement signal JFCSS produced. The NOR circuit $G_2$ turns off the transistor $Tr_1$ with the signal JFCSS. Hence, the magnet is deenergized in synchronism with the production of the signal JFCSS so as to hold the barrel 1 of the photographic lens. The NOR circuit $G_2$ brings the transistor $Tr_1$ into the opened state also with the output T ED of a timer circuit 700 to be explained and the output signal of the predetermined distance setting circuit 500 to be explained.

5. Gain Selection Control Circuit 400

The circuit 400 is intended to produce a control signal for the gain selection amplifying circuit $OP_1$. In the present embodiment, whether the object with a high reflection coefficient is present between the very near distance and 2 m is detected by shifting the gain of circuit $OP_1$ to a low level when the object is present while making the gain high when the object is not present. In the circuit 400, the inverting input of a comparator circuit $COMP_2$ receives a signal of a predetermined level through a resistance for dividing the voltage of the low level bias KVC. The non-inverting input of comparator $COMP_2$ receives the output of the circuit $OP_5$. An AND circuit $G_3$ receives the output signal of the comparator $COMP_2$ and the distance measurement preparation mode signal PRSC.

A flip-flop $FF_4$ is reset with a signal $\overline{LEST}$ produced at the first step of the stroke of the release button (not shown in the drawing) and its output $\overline{Q}$ establishes the high gain in the circuit $OP_1$. The signal LEST goes high in operative engagement with the press down of the release button and low with completion of the winding operation. Consequently, in the initial state terminal $\overline{Q}$ of the flip-flop $FF_4$ is high.

In the distance measurement preparation mode, the predetermined level KVC sensed by the voltage dividing resistance is compared by the comparator $COMP_2$ with the output of the circuit $OP_5$. In response, when the $OP_5$ output surpasses a certain level (in case an object with a high reflection coefficient is present between the very near distance and a 2 m distance), the gate $G_3$ is opened, the flip-flop $FF_4$ is set and the low gain is selected in the circuit $OP_1$. When the $FF_4$ circuit is not thus set (in case no object with a high reflection coefficient is present within a 2 m distance) the following signals are processed while the gain of circuit $OP_1$ remains high.

6. Determined Distance Setting Circuit 500

The circuit 500 applies a control signal to the prohibiting drive circuit 300 so as to set the photographic objective lens at the predetermined position, for example, at the 5 m distance setting position. A comparator circuit $COMP_3$ serves for carrying out a comparison operation in the same way as comparator $COMP_2$. An AND circuit $G_6$ is opened by means of a signal 5M produced with the operation of the switch $SW_2$ and the output signal of $COMP_3$ so as to demagnetize the magnet Mg through the NOR circuit $G_2$.

7. Timer Circuit 700 and IRED Driving Circuit 800

The timer circuit 700 is composed of the NOR gate $G_4$, the seven-stage ripple counter T, and the flip-flops $FF_5$ and $FF_6$. A signal 5M produced with the operation of the switch $SW_2$ releases the reset counter T. Hence, the 1/6 frequency divided pulses are applied to the counter T through the NOR circuit $G_4$ from the signal producing circuit 600. When the frequency divided pulses are stepped up by two stages of counter T, the circuit $FF_5$ connected to the second stage is set so that the IRED element extinguishing signal $\overline{LDSP}$ is produced after a short delay from the time at which the signal 5M is produced. When the frequency divided pulses are connected up by seven stages, the circuit $FF_6$ is set by means of the $Q_7$ output signal and a signal TMED is produced at flip-flop $FF_6$. The magnet Mg is demagnetized by signal TMED, whereby the cam plate 5 has set the photographic lens at the infinite distance position.

The driving circuit 800 is composed of a NAND gate $G_5$, an operational amplifier OP, for adjusting the light emitting current of element IRED, a variable resistance $VR_1$ and transistors $Tr_2$ and $Tr_3$. When the JFCSS signal is low, the transistor $Tr_2$ is brought into the opened state by means of the $\overline{LDSP}$ signal and the IRED element stops the light emission. Further, when the JFCSS signal is high, the IRED also stops the light emission. A voltage constant circuit 900 is conventional so that its detailed explanation is omitted. A conventional constant voltage circuit and operational amplifiers $OP_7$ and $OP_8$ serve for forming the predetermined biases VC' and KVC. With the closing of the power source switch SWM a voltage $E_1$ is produced by the battery and the smoothing capacitors $C_1$ and $C_2$ and applied to the magnet Mg and the constant voltage circuit ER. The constant voltage circuit ER forms a predetermined bias signal in response to the production of the voltage $E_1$.

8. Operation

In operation, the very near distance, "minimum distance" or "closest focus" is defined as the shortest distance capable of being set with the photographic objective lens, say 0.8 m, the distance measuring limit is 5 m in the present embodiment, and the medium distance is 2 m in the present embodiment.

(A) For an object with high reflection coefficient between the minimum distance and the medium distance.

When the main switch SWM is closed and the release button (not shown in the drawing) is pushed down, the magnet Mg is excited with the first stroke of the release button so as to attract and hold the holding claw 11 against the force of the spring 12. Then the holder 10 is released, so that the cam plate 5 starts to rotate in response to the spring 7. The switch $SW_1$ is now opened.

As a result, the control signal producing circuit 600 divides the frequency of the output signal of OSC by six to produce a 10 KHz pulse signal at the output terminal $O_1$. At this time, the distance measurement signal, namely the 5M signal has not yet been produced, so that the counter T does not operate. Further, the signal JFCSS is low, while signal $\overline{\text{LDSP}}$ is high. Consequently, the NAND gate $G_5$ opens and closes the transistor $Tr_2$ and $Tr_3$ intermittently, so that the element IRED flickers at the frequency of 10 KHz.

The cam surface $C_3$ now moves the lever 15 from the medium distance toward the very near distance and the element IRED starts to scan with the light beam. Because the circuit $FF_4$ is reset with signal $\overline{\text{LEST}}$ formed at the first stroke of the release button, the circuit $OP_1$ is held in the high gain state by the $\overline{\text{LEST}}$ signal. As the object between the minimum distance and the medium distance is illuminated with the light beam from the element IRED while the lever 15 is moved, the output of the element SPC is increased. Because the element IRED flickers periodically, the output current of the element SPC assumes the pulsating waveform superimposed upon the waveform of the low frequency component of daylight or a fluorescent lamp (iDC shown at graph (b) in FIG. 4(B)).

The circuit MOS has DC and low frequency component suppressing characteristics as explained so that the signal wave obtained at the output of the circuit $OP_5$ through the connecting capacitor CB, the circuit $OP_1$, and the sample and hold circuits $OP_3$ and $OP_4$ becomes maximum when the object is illuminated with the full projected light beam. Comparator $COMP_2$ detects that the output of the circuit $OP_5$ is larger than a proportion of the predetermined level signal KVC, namely the output of the circuit $OP_5$ surpasses the predetermined level when the object is between the minimum distance and the medium distance. The flip-flop $FF_4$ is then set by the AND gate circuit $G_3$ so that the level at the $\overline{Q}$ terminal becomes low. As a result, the gain of the circuit $OP_1$ becomes low. Consequently, the level of the output signal of the $OP_5$ circuit becomes low. The maximum value is now obtained when the light beam is projected on the object during the scanning by means of the light beam (FIG. 6(A)(α)). The circuit $OP_6$ and the circuit $G_1$ are set in the non-operative state by means of the signal PRSC. Hence, the magnet Mg remains excited by the output of the circuit $OP_5$ as shown by graph (a) in FIG. 6(A).

With the termination of the above mentioned gain control, the distance measurement preparation mode is completed. This is indicated by the fact that the cam plate 5 continues rotating, while the switch $SW_3$ is opened so that the level of the PRSC signal becomes low. On the other hand, the barrel of the photographic lens is not moved along the optical axis by the cam surface $C_1$ but kept at the minimum distance during the distance measurement preparation mode.

When the switch $SW_3$ is opened, the distance measurement mode starts. The barrel 1 of the photohgraphic objective lens is then moved by the cam surface $C_2$ from the minimum distance to infinity. At the same time, the cam part $C_4$ changes the projection direction of the light beam of the element IRED from the minimum distance to infinity by means of the scanning lever 15. As explained, the output of the circuit $OP_5$ becomes maximum when the light beam again scans the object toward which the light receiving lens is directed (FIG. 6(A)(β)). After a lapse of a predetermined time, a high signal JFCSS is obtained from the circuit $COMP_1$ so as to demagnetize the magnet Mg. As a result, the lens barrel 1 is held by means of the holding claw 11, so as to terminate the distance setting of the photographic objective lens. By means of the JFCSS signal the transistor $Tr_3$ is brought into the opened state, and the element IRED is put out so as to economize on power. The camera shutter is now released and the film is exposed. In response to the winding of the film and so on, the cam plate 5 is moved again into the position shown in FIG. 1. Because the claw 11 is engaged with the claw 3, it is possible for the cam plate 5 to move into the position shown in FIG. 1.

With the termination of the winding operation, the level of the LEST signal again becomes low so that the flip-flop $FF_4$ is reset while the high gain forming circuit is selected in the circuit $OP_1$. If the object is between the minimum distance and the medium distance and the reflection factor of the object is low, there is a possibility that the output of the $OP_5$ circuit has not yet reached the predetermined level. In this case, even if the object is in the above mentioned range, the distance measuring mode starts while the gain of the $OP_1$ circuit remains high. Hence, due to the low reflection factor, the distance measuring factor can be improved because the gain of the circuit $OR_1$ is made high so as to raise the gain of the signal processing circuit.

(B) The object is a little beyond the medium distance.

The distance measurement preparation mode takes place in the same way as in the aforementioned case (A). However, the object is near the medium distance, and the IRED element starts to scan from the medium distance to the nearest distance. The light beam reflected by the object and received by the element SPC may cause the output of the circuit $OP_5$ to surpass the predetermined level if the reflection factor of the object is high. (FIG. 6(B)). In the same way as in the aforementioned case (A), the circuit $COMP_2$ brings the circuit $OP_1$ to the low gain state and then the distance measurement mode takes place. The operation is then the same as in case (A), so that the detailed explanation is omitted.

(C) The object is far beyond the medium distance but within the distance measurement limit (5 m).

In this case, the output of the circuit $OP_5$ does not reach the predetermined level in the distance measurement preparation mode. Hence, the circuit $FF_4$ remains in the reset state and the distance measurement mode takes place while the gain of the circuit $OP_1$ remains high. (FIG. 6(C)). The light beam omitted from the element IRED is condensed and projected on the object, and the level of the reflected light decreases proportionally to the square of the distance. However, this decrease of the level is compensated for by making the gain of the circuit $OP_1$ high. Thus, nearly the same measuring accuracy as the aforementioned cases (A) and (B) is available as the distance measurement is carried out.

(D) The object is beyond the distance measurement limit.

In this case, no light beam is projected on the object during the distance measurement preparation mode. Hence, the distance measurement mode starts while the gain of the circuit $OP_1$ is kept high in the same way as in the aforementioned case (C) as shown in FIG. 6(C). As soon as the cam plate 5 is set at the position beyond the distance measurement limit 5 m by means of the cam surface $C_2$ during the distance measurement mode, the switch $SW_2$ is closed by the pin 19 on the cam plate 5. Closing of the switch $SW_2$ produces the high level signal 5M which is applied to the NOR circuit $G_4$ and the reset terminal of the counter T. Further, the level of the signal 5M becomes low, the flip-flops $FF_5$ and $FF_6$ are brought into the settable state. When the pulse train whose frequency is divided into six is applied to the counter T through the NOR circuit $G_4$ and stepped up by 2 stages, the circuit $FF_5$ is set by means of the output $Q_2$ of the counter T. Because, at this time, the level of the output of the circuit $OP_5$ has surpassed the predetermined value by means of the light reflected on the object, the magnet Mg is demagnetized through the AND circuit $G_6$ and the NOR circuit $G_2$ so as to hold the barrel 1 of the photographic lens at the $\overline{5m}$ set position. A little delayed from this holding time, the counter T produces the output $Q_2$, while the element IRED is put out by means of the NAND circuit $G_5$. If the object is near the 5 m position and the reflection factor is low, the output of the AND circuit $G_6$ cannot be obtained because the output of the $COMP_3$ circuit is high. Then the output $Q_7$ of the counter T demagnetizes the magnet Mg with the output Q signal TMED of the circuit $FF_6$, and the photographic objective lens is set at infinity.

After the signal LDSP is produced, the element IRED is extinguished even when the photographic lens is in motion so as to economize on power.

When the object is at or near infinity, (for example, more than 5 m) the gain of the circuit $OP_1$ remains high. Then, by means of the signal TMED, the magnet Mg holds the barrel 1 of the photographic objective lens at infinity. This can be mechanically realized by making the count termination of the counter T correspond to the rotary speed of the cam plate 5. The above is only one of the desirable embodiments.

The gist of the present invention can be applied to various kinds of instruments and distance measuring systems other than a camera. For example, in the above-mentioned embodiment, whether the object is between the minimum distance or the medium distance is detected during the distance measurement preparation mode. However, whether the object is near the minimum distance or whether the object is near the distance measurement limit may be detected. Also, it is unnecessary that many points in the detecting range be scanned. It is sufficient to scan at least one point in the distance measurement range. In the above embodiment, the output of the distance measuring light sensing element is used to vary the output of the signal processing circuit. However, a separate photoelectric converting element may be used in addition to the distance measuring light sensing element. In this case, the same effect can be obtained as in the above embodiment by varying the intensity of the light beam of the IRED, for example, instead of varying the gain of the circuit.

Figure 7:
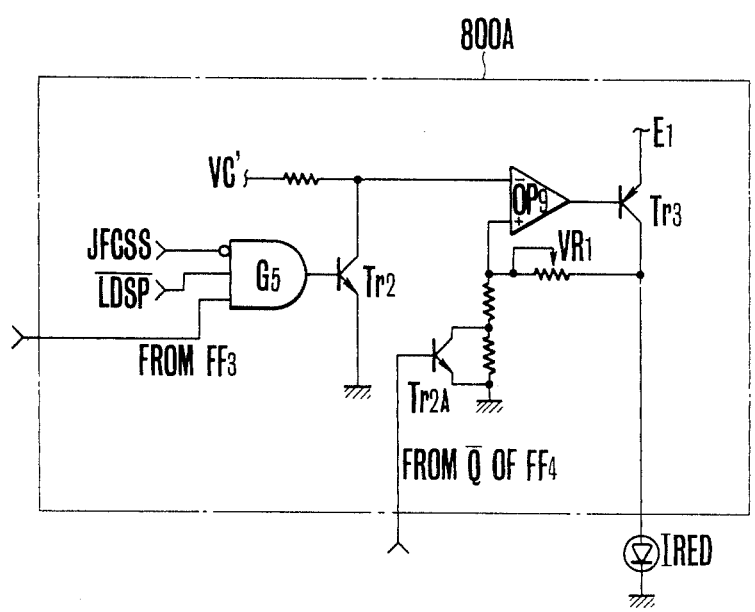
FIG. 7 shows the circuit of the light emission drive of another embodiment of the present invention.

In the embodiment shown in FIG. 7, a driving circuit 800A, almost similar to that 800, is used instead of the circuit $OP_1$ shown in FIG. 3. Here, the output signal from the output $\overline{Q}$ of the flip-flop $FF_4$ shown in FIG. 3 controls the transistor 2A. The gain of the operational amplifier $OP_9$ is controlled and the base current of the transistor $Tr_3$ is controlled so that the intensity of the light emitted from the element IRED is controlled. Consequently, the same effect as that of the first embodiment can be obtained. Further, the photoelectric converting circuits, the timer circuit and so on shown in FIG. 7 are the same as those shown in FIG. 3, so their explanation is omitted here.

As explained above, in accordance with the present invention, a constant distance measuring accuracy can be obtained despite variation of the light sensed with the photoelectric converter due to the difference of the distance when the distance up to the object is optically measured. Also, the distance measuring accuracy taking a reflection factor of the object, namely a factor other than the distance, into consideration can be held almost constant.

Further, in accordance with the present invention in the distance measuring preparation mode before the distance measuring mode, the distance signal processing system respectively, the light projecting system is preset while the position and the reflection factor of the object is taken into consideration, in which state the following distance measuring operation is carried out so that the distance measuring operation can be carried out while the optical distance measuring error due to the object distance is kept as small as possible. As a result, it is not necessary for the signal processing system to process the level change signal over a wide range so that the distance measuring accuracy can be obtained by means of a simple circuit. Further, in case of the distance measuring system combined with a light projector, the distance measuring signal is detected in synchronism with the flickering of the light beam emitted from the light projector so that the distance measurement preparation mode is carried out with the distance measuring signal with a small noise component, while in combination with the D.C. suppressing circuit and so on the distance measurement preparation mode with further higher accuracy can be carried out. Further, in accordance with the present invention, the signal processing system itself processes the distance measuring signal in a narrow band level with the distance measuring preparation mode so that the distance measurement accuracy can be kept constant. Consequently, the voltage of the power source may be low.

In consequence, if the present invention is applied as the distance measuring device for a camera, the device is quite suited for a small camera with a small space for the power source.

What is claimed is:

1. A distance measuring system comprising:
    (a) light sensitive means for converting light from an object whose distance is to be measured into an electrical signal;
    (b) amplifying means connected to the output of said light sensitive means for amplifying the electrical signal;
    (c) output means responsive to the amplified electrical signal and for producing an output signal corresponding to the distance to the object; and
    (d) gain control means connected to the amplifying means for making the gain of said amplifying means high when the level of the electrical signal from said light sensitive means is lower than a predetermined level prior to the initiation of the operation of said output means;

said output means including means for inhibiting the output signal until the gain control means completes the gain control operation.

2. A distance measuring system according to claim 1, wherein said light sensitive means includes a light sensitive element.

3. A distance measuring system according to claim 1, further comprising:

(a) light emitting means for emitting light to illuminate the object; and
(b) means for successively changing the light projection angle of the light emitting means.

4. A distance measuring system according to claim 1, wherein said output means includes:
(a) detecting means for detecting a peak of the amplified electrical signal; and
(b) means for producing an adjusting operation termination signal when the detecting means detects the peak.

5. A distance measuring system comprising:
(a) light sensitive means for converting light incident from an object whose distance is to be measured into an electrical signal;
(b) amplifying means connected to the output of said light sensitive means for amplifying the electrical signal;
(c) output means responsive to the amplified electrical signal and for producing an output signal corresponding to a distance to the object; and
(d) gain control means connected to the amplifying means for controlling the gain of said amplifying means in response to the electrical signal from the light sensitive means; and
(e) means for inhibiting the output means from producing the output signal until the gain control means completes the gain control operation.

6. A distance measuring system comprising:
(a) projecting means for emitting energy which is converted on an object into a distance signal representing an object distance;
(b) sensing means for receiving the distance signal from the object to convert it into an electrical signal;
(c) output means responsive to the electrical signal and for producing an output signal corresponding to a distance to the object;
(d) control means connected to the projecting means to control the magnitude of the energy of the projecting means in correspondence to the electrical signal; and
(e) means for inhibiting the output means from producing the output signal until the control means completes the control operation.

7. A distance measuring system according to claim 6, wherein said projecting means includes a light emitting element.

* * * * *